US010166615B2

(12) United States Patent
Jourdan et al.

(10) Patent No.: US 10,166,615 B2
(45) Date of Patent: Jan. 1, 2019

(54) SLIP DETECTOR

(71) Applicant: Marvel Manufacturing Company, Inc., Oshkosh, WI (US)

(72) Inventors: James Jourdan, Fond du Lac, WI (US); Dean T Saari, Hortonville, WI (US); Marti Kallas, Oshkosh, WI (US)

(73) Assignee: Marvel Manufacturing Company, Inc., Oshkosh, WI (US)

( * ) Notice: Subject to any disclaimer, the term of this patent is extended or adjusted under 35 U.S.C. 154(b) by 295 days.

(21) Appl. No.: 15/341,721

(22) Filed: Nov. 2, 2016

(65) Prior Publication Data
US 2017/0120406 A1   May 4, 2017

Related U.S. Application Data

(60) Provisional application No. 62/250,576, filed on Nov. 4, 2015.

(51) Int. Cl.
*B23Q 7/04* (2006.01)
*B23D 55/04* (2006.01)
*B23D 59/00* (2006.01)
*B23Q 17/00* (2006.01)

(52) U.S. Cl.
CPC .......... *B23D 55/04* (2013.01); *B23D 59/001* (2013.01); *B23Q 7/042* (2013.01); *B23Q 7/047* (2013.01); *B23Q 17/003* (2013.01)

(58) Field of Classification Search
None
See application file for complete search history.

(56) References Cited

U.S. PATENT DOCUMENTS

| 2003/0000358 | A1* | 1/2003 | Harris | B23D 47/04 83/247 |
| 2016/0236290 | A1* | 8/2016 | Behringer | B23Q 3/066 |
| 2018/0169775 | A1* | 6/2018 | Stolzer | B23D 55/043 |

* cited by examiner

*Primary Examiner* — Benjamin Sandvik
(74) *Attorney, Agent, or Firm* — Patrick M. Bergin

(57) ABSTRACT

A machine including: a table having a surface adapted to have a workpiece lay and move thereon, and a vise for gripping the workpiece. The machine also includes a drive system for moving the vise and workpiece a distance along the table surface, and a sensor assembly connected to the vise for measuring an amount of slip distance occurring between the vise and the workpiece. The machine also includes a control unit connected to the sensor assembly and the drive system for storing the measured slip distance and for operating the drive system and for operating to do at least one of, when a predetermined amount of slip distance is detected: sounding an alarm and stopping further movement of the workpiece, and, when a slip distance is measured, for causing the drive system to move the vise and workpiece an added distance equal to the measured slip distance.

7 Claims, 3 Drawing Sheets

SLIP DETECTOR

This application claims the benefit of U.S. Provisional Application No. 62/250,576, filed Nov. 4, 2015.

BACKGROUND

This disclosure relates generally to the field of table cutting machines for wood or metal products. More specifically, the disclosure relates to automated sawing machines using band or circular saws.

Automatic sawing machines are known in the art to possess several automatic or semi-automatic features. Typically, these include, but are not limited to: automatic advancement of a blade into a workpiece and subsequent retraction of the blade to a home position; automatic actuation of a workpiece shuttle to pull a workpiece in the direction of work flow to a sawing position; the automatic opening and closing of stationary and shuttle vises; and a means to cut several pieces to the same length and angle of cut.

Automatic sawing machines must operate at very high tolerance levels. High tolerances require the ability to position the workpiece within, for example, 0.0002". While achieving these fine tolerances is possible mechanically using known methods, there is no known, effective automated way to monitor the motion of the workpiece relative to the positioning device to ensure that the cut piece will be of the proper length. As a result, in order to achieve high tolerances, operators must physically measure the workpiece. This manual step slows production and demands a high degree of operator skill and accuracy.

While automatic sawing machines are highly automated, current machines lack the ability to monitor some aspects of machine operation. For example, materials with irregularities, such as burs, can become caught on some structure of the saw while being moved into a cutting position, resulting in slippage between the material and the vise. Additionally, bundles of material are sometimes held together with straps. The straps can also become caught on some structure of the saw while the bundle is being moved into a cutting position, causing the workpiece to slip relative to the vise. Such slippage could result in the workpiece being cut to a length that is out of tolerance.

SUMMARY

This disclosure provides a machine table on which a workpiece rests while being sawed. It also has at least one shuttle vise. The shuttle vise is operable to grip the workpiece and to move the workpiece into the cutting area. This disclosure provides a sensor operable to detect movement between one or more workpieces and the vise used to move the workpiece. Upon detection of movement, the sensor is operable to detect the magnitude of the movement. An additional embodiment of this disclosure is operable to provide an alert to the operator upon detection of any movement between the workpiece and the vise. Yet a further refinement could identify an acceptable tolerance for movement and only provide a warning to the operator in the event that the magnitude of the movement was larger than a certain threshold. A further embodiment of the disclosure could provide automatic correction for the amount of the slip. A warning to the operator that slip had occurred could accompany the correction.

DETAILED DESCRIPTION OF AN EMBODIMENT

Figure 3:
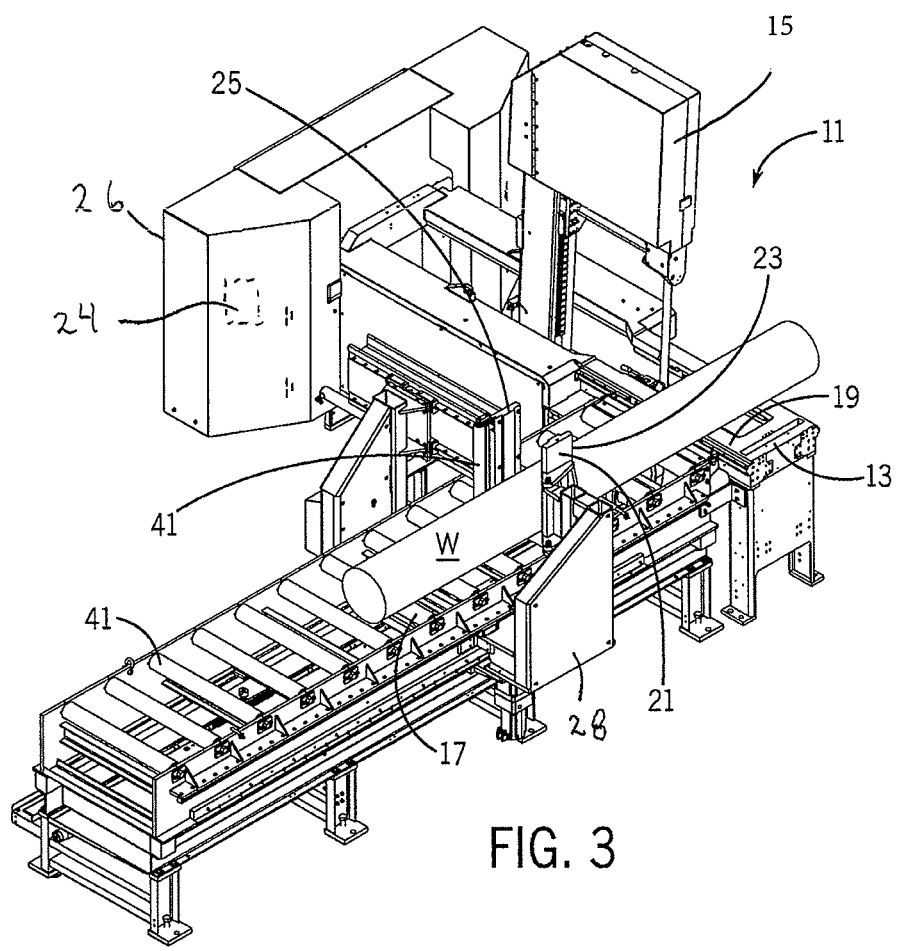
FIG. 3 is a top and side perspective view of the slip detector as it might be installed on a band saw machine.

Now referring to the drawings in detail, wherein like reference numbers refer to like elements throughout, FIG. 3 shows a band saw machine 11 with a slip detection device 41. The slip detection device 41 disclosed herein is not however limited to the illustrated embodiment. It may, for example, be employed in automatic saws of the hack saw or other non-band saw variety. Certain aspects of the disclosure may be advantageously employed in any automatically controlled mechanism with components having a linear motion.

Band saw machine 11 comprises a machine table 13, a saw column 15 and a shuttle table 17. As shown in FIG. 3, machine table 13 has a table surface 19. Band saw machine 11 also has at least one shuttle vise 21, which is used to advance workpiece W along the table surface 19 to a cutting position.

Saw column 15 supports an upper band wheel contained in a band wheel cover, and a lower band wheel enclosed in a lower band wheel cover (not shown). As shown in FIG. 3, saw column 15 is movable back and forth at right angles to workpiece W. Shuttle table 17 has a plurality of dead or power rollers (not shown) and a shuttle vise 21. The shuttle vise 21 has a front shuttle vise jaw 23 and a hydraulically movable rear shuttle vise jaw 25. At the front of the band saw machine 11 is a programmable controller or control unit 24 in a manual console 26.

Shuttle vise 21 is used to move the workpiece W into the cutting area. Once the shuttle vise 21 is clamped on to the workpiece W, the shuttle vise 21 is moved by a drive system 28 to place the workpiece W into the cutting area. Shuttle vise 21 is operable to provide position feedback. Sometimes, during travel, the workpiece W will catch on various parts of the machine and slip relative to the shuttle vise 21, which can result in inaccurate cuts, which are highly undesirable.

Figure 1:
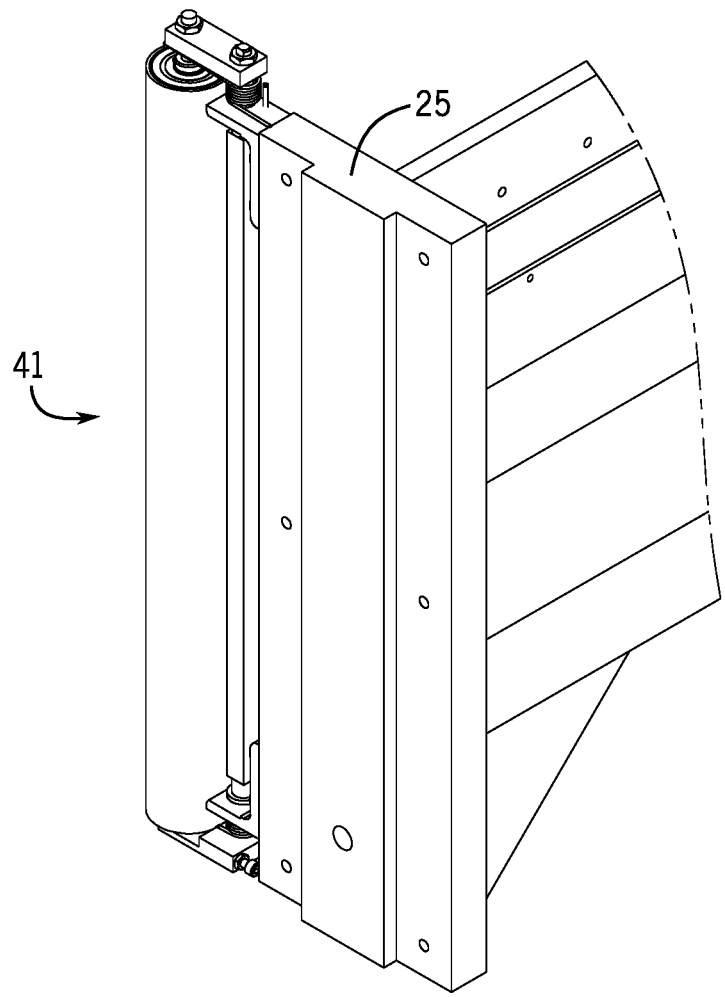
FIG. 1 is front and side perspective view of a slip detector according to this disclosure.
Figure 2:
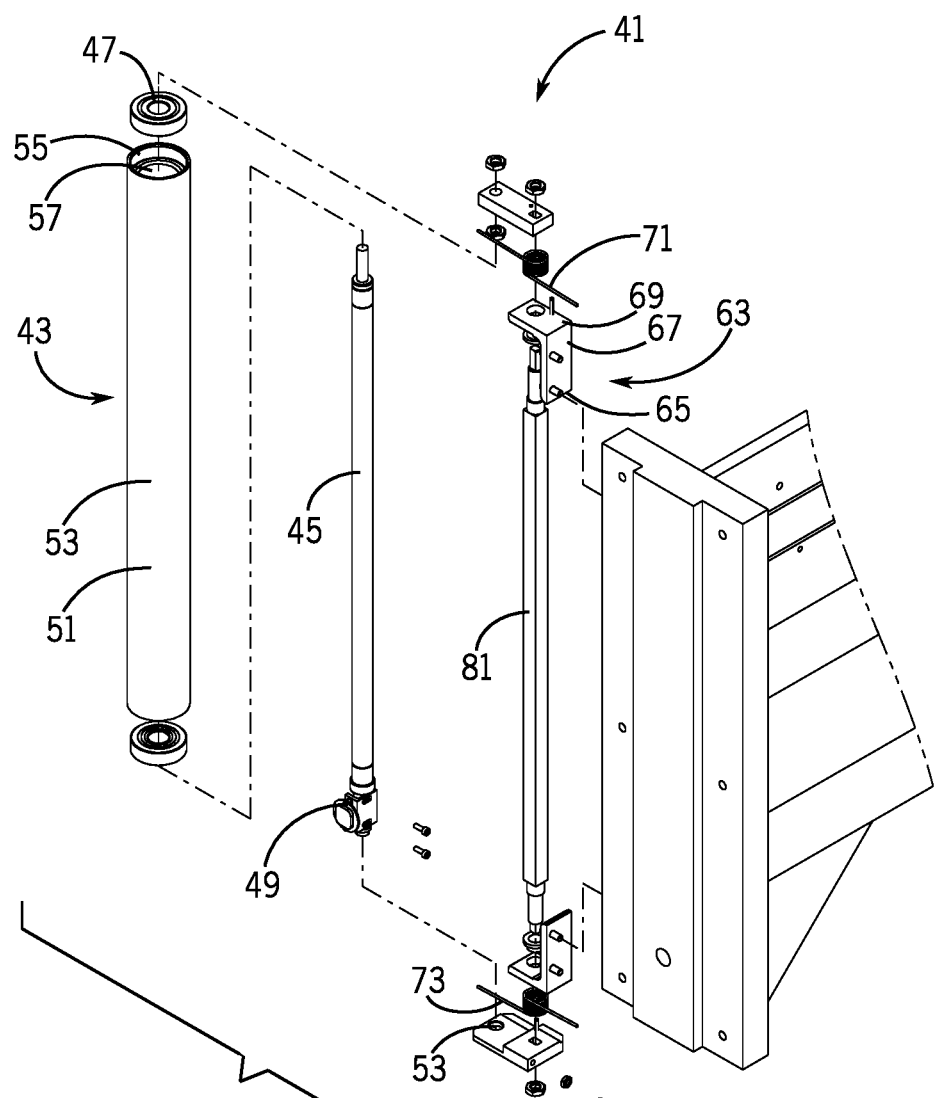
FIG. 2 is an exploded view of the slip detector.

In one embodiment, the slip detector 41 is fixedly attached to the rear shuttle vise 25. As shown in FIG. 1, the slip detector 41 comprises a sensor assembly 43 and a mounting assembly 63. Sensor assembly 43 is comprised of roller 51 with a high friction exterior surface 53. Roller 51 has a hollow interior 55 defined by an interior surface 57. Roller 51 is mounted on roller shaft 45 via bearings 47 such that roller 51 can spin freely relative to the roller shaft 45. A sensor 49 capable of sensing rotation of the roller 51 by sensing movement of the interior surface 57 of the roller 51 is mounted on the roller shaft 45. One type of sensor 49 that could be used to detect the movement of the roller 51 is an optical mouse sensor, although many other types of sensors 49 could be used and this disclosure is not limited to the use of an optical mouse sensor.

Mounting assembly 63 is designed to bias the sensor assembly against the workpiece W. As shown, the mounting assembly 63 comprises a pair of L-shaped mounting brackets 65, each comprising a first leg 67 attached to the rear shuttle vise 25 and a second leg 69 comprising at least an aperture 71. Aperture 71 in the second leg 69 of the mounting bracket 65 is designed to accommodate pivot shaft 81, and to allow the pivot shaft 81 to protrude through the aperture 71.

The roller 51 is biased toward the workpiece W by the mounting assembly 63 including a pivot shaft 81 that extends between the L-shaped mounting brackets 65 and through the aperture 71 in the second leg 69 of the mounting brackets 65 to accommodate torque arm 53 and torsion spring 73. The torsion spring 73 is anchored to the mounting bracket 65 such that the torque arm 53 is biased toward the workpiece W. The sensor assembly 43 is attached to the torque arm 53 in any conventional manner. The mounting assembly 63 could take several forms and the way in which the sensor assembly 43 is mounted to the shuttle vise is not a limitation of the disclosure.

In operation, the workpiece W is placed on the shuttle table 17. The shuttle vise 21 clamps onto the workpiece W. The shuttle vise 21 is then operable to move the workpiece W into a cutting position. When the shuttle vise 21 is clamped onto the workpiece W, the roller 51 is biased toward the workpiece W. Should the workpiece W move relative to the shuttle vise, the roller 51 will be caused to rotate, which will be detected by the sensor 49. Should the rotation be in excess of a preset amount, the operator will be alerted via an alarm (not shown) and cutting operations will cease. Alternatively, the machine could be programmed via controller to compensate for the amount of movement detected by sensor 49 by moving shuttle vise 21 accordingly.

More particularly, the control unit 24 is connected to the sensor assembly 13 and the drive system 28 for storing the measured slip distance and for operating the drive system 28 and, when a slip distance is measured, for causing the drive system 28 to move the vise 21 and workpiece W an added distance equal to the measured slip distance. The control unit can also either sound an alarm or stop further movement of the workpiece, or do both.

The band saw 11 can in alternate embodiments (not shown) use multiple slip detectors 41. As depicted, the slip detector 41 is mounted on the rear shuttle vise 25. In the case of a bundle of materials, this location would be effective in detecting slippage only for those individual workpieces W that come into contact with roller 51, which could potentially leave such slip undetected on three sides. Additional slip detectors 41 (not shown) could be used on other sides of the workpiece W to detect any slip of the workpiece W relative to the movement of the shuttle vise 21.

Although a structure and a method for carrying out the disclosure is disclosed above, practice of the disclosure disclosed herein is not limited thereto. It will be manifest that various additions, modifications, and rearrangements of the features of this disclosure may be made without deviating from the spirit and scope of the underlying inventive concept.

The invention claimed is:

1. A method of moving a workpiece on a table by gripping the workpiece with a vise, the workpiece being cut when brought along the table to a saw, the method comprising the steps of:

gripping the workpiece with the vise, moving the workpiece some move distance X along the table to the saw, measuring the amount of slip distance Y occurring between the vise and the workpiece, and moving the workpiece an additional distance Y equal to the measured slip distance Y so the total distance traveled by the workpiece along the table is equal to the move distance X plus the measured slip distance Y.

2. A machine including:

a table having a surface adapted to have a workpiece lay and move thereon, a vise for gripping the workpiece, a drive system for moving the vise and workpiece a distance along the table surface, a sensor assembly connected to the vise for measuring an amount of slip distance occurring between the vise and the workpiece, and a control unit connected to the sensor assembly and the drive system for storing the measured slip distance and for operating the drive system and, when a slip distance is measured, for causing the drive system to move the vise and workpiece an added distance equal to the measured slip distance.

3. A machine in accordance with claim 2 wherein the sensor assembly comprising a roller with a high friction exterior surface mounted on a roller shaft, and a sensor capable of sensing rotation of the roller.

4. A machine in accordance with claim 2 wherein the vise includes a front vise jaw and a movable rear vise jaw.

5. A machine including:

a table having a surface adapted to have a workpiece lay and move thereon, a vise for gripping the workpiece, a drive system for moving the vise and workpiece a distance along the table surface, a sensor assembly connected to the vise for measuring an amount of slip distance occurring between the vise and the workpiece, and a control unit connected to the sensor assembly and the drive system for operating to do at least one of, when a predetermined amount of slip distance is detected: sounding an alarm and stopping further movement of the workpiece.

6. A machine in accordance with claim 5 wherein the sensor assembly comprising a roller with a high friction exterior surface mounted on a roller shaft, and a sensor capable of sensing rotation of the roller.

7. A machine in accordance with claim 5 wherein the vise includes a front vise jaw and a movable rear vise jaw.

\* \* \* \* \*